United States Patent
Fujio et al.

(10) Patent No.: US 7,428,069 B2
(45) Date of Patent: Sep. 23, 2008

(54) IMAGE PROCESSING APPARATUS AND IMAGE PROCESSING METHOD FOR CORRECTING COLOR OF IMAGE

(75) Inventors: Masayasu Fujio, Nagano-ken (JP); Nobuhisa Takabayashi, Nagano-ken (JP); Masaru Hoshino, Nagano-ken (JP)

(73) Assignee: Seiko Epson Corporation, Tokyo (JP)

(*) Notice: Subject to any disclaimer, the term of this patent is extended or adjusted under 35 U.S.C. 154(b) by 924 days.

(21) Appl. No.: 10/815,249

(22) Filed: Mar. 30, 2004

(65) Prior Publication Data
US 2004/0257598 A1  Dec. 23, 2004

(30) Foreign Application Priority Data
Mar. 31, 2003 (JP) .............................. 2003-095489
Mar. 31, 2003 (JP) .............................. 2003-095490

(51) Int. Cl.
*G06F 15/00* (2006.01)
*G06F 3/12* (2006.01)
*G06K 1/00* (2006.01)
*G06K 15/00* (2006.01)
*H04N 1/40* (2006.01)

(52) U.S. Cl. ..................... 358/1.15; 358/1.9; 358/3.28

(58) Field of Classification Search ................ 358/1.15, 358/1.1, 1.9, 3.23, 3.27, 3.28, 5.18, 540, 358/518
See application file for complete search history.

(56) References Cited

U.S. PATENT DOCUMENTS 6,839,064 B2  1/2005 Nakami
7,177,466 B1 * 2/2007 Bernard et al. ............ 382/167
7,199,900 B2  4/2007 Ogatsu et al.

FOREIGN PATENT DOCUMENTS

| JP | 09-322009 | 12/1997 |
|---|---|---|
| JP | 2002-033994 | 1/2002 |
| JP | 2002-135604 | 5/2002 |
| JP | 2002152542 | 5/2002 |
| JP | 2003-046797 | 2/2003 |
| JP | 2003-058354 | 2/2003 |

OTHER PUBLICATIONS

Yuasa et al. (US Pub. No. 2002/0118210 A1).*
Abstract of Japanese Patent Publication No. 2002-135604 Pub. Date: May 10, 2002, Patent Abstracts of Japan.

(Continued)

*Primary Examiner*—Douglas Q Tran
(74) *Attorney, Agent, or Firm*—Martine Penilla & Gencarella, LLP (57) ABSTRACT

A color correction profile is generated, based on a color difference between an original image prior to arbitrary color adjustment and a resulting color-adjusted image. The generated color correction profile is stored in mapping to an ID of a digital camera used for taking the image. The profile attachment technique of the invention receives each input image, sets an ID of a digital camera included in the input image as a key of retrieval, and retrieves a color correction profile stored in mapping to the ID of the digital camera (step S210). When any color correction profile is retrieved successfully corresponding to the ID of the digital camera, the retrieved color correction profile is attached to the image (step S230).

21 Claims, 7 Drawing Sheets

OTHER PUBLICATIONS

Adobe Systems, Inc. Website content regarding Adobe Photoshop 7.0 entitled "Distinctive Retouching and Color Correction," retrieved from the Internet on Mar. 13m 2003 (URL: http://www.adobe.co.jp/products/photoshop/overview.html) (with partial English translation).

Abstract of Japanese Patent Publication No. 09-322009, Pub. Date: Dec. 2, 1997, Patent Abstracts of Japan.

Abstract of Japanese Patent Publication No. 2002-033994, Pun. Date: Jan. 32, 2001, Patent Abstracts of Japan.

Abstract of Japanese Patent Publication No. 2003-046797, Pub. Date: Feb. 14, 2003, Patent abtracts of Japan.

Abstract of Japanese Patent Publication No. 2002-152542, Pub. Date: May 24, 2002, Patent Abstracts of Japan.

Abstract of Japanese Patent Publication No. 2003-058354, Pub. Date: Feb. 28, 2003, Patent Abstracts of Japan.

* cited by examiner

Attachment of Profile

The following profiles are options for attachment to this image. Select one.

○ a***** Profile
○ b***** Profile
○ c***** Profile
○ Default Profile
○ Attachment of No Profile

| Cancal | OK |

IMAGE PROCESSING APPARATUS AND IMAGE PROCESSING METHOD FOR CORRECTING COLOR OF IMAGE

BACKGROUND OF THE INVENTION

1. Field of the Invention

The present invention relates to an image processing apparatus and an image processing method. Specifically, the invention relates to an image processing apparatus and an image processing method that correct color of an image.

2. Description of the Prior Art

A printing system that carries out color management and prints processed images has been proposed as an image processing apparatus (for example, see Patent Laid-Open Gazette No. 2002-135604). This proposed printing system downloads image data and a profile for an input device from an image server, carries out color matching of the downloaded image data with the downloaded profile for the input device and a profile for a printer connecting with the user's computer, and causes the printer to output the processed image data after the color matching.

Retouching software for color adjustment of photographic images has also been proposed (for example, see 'Adobe Photoshop' by Adobe Systems Inc. [retrieved on Mar. 13, 2003], the Internet URL: http://www.adobe.co.jp/products/photoshop/overview.html). This retouching software program is used to erase undesired marks and scratches and to adjust the exposure and saturation.

The prior art printing system performs color matching of the input image data, based on the profile for the input device and the profile for the output device. The color matching is carried out to reproduce the color of the input image with high accuracy, while not reflecting the user's preferences. The color of the resulting printed image may thus be quite different from the user's taste. The retouching software may be used to modify the image according to the user's preferences. This, however, requires individual modification of the respective images and consumes extremely long time and heavy labor for printing a large number of images according to the user's preferences.

SUMMARY OF THE INVENTION

The image processing apparatus and the image processing method of the invention thus aim to facilitate color correction of a large number of images according to the user's preferences. The image processing apparatus and the image processing method of the invention also aim to implement color matching and print or display a processed image according to the user's preferences.

In order to achieve at least part of the above objects, the image processing apparatus of the present invention is constructed as follows.

A first image processing apparatus of the present invention is an apparatus that corrects color of an image, the image processing apparatus including: an information storage module that stores a mapping of device identification information for identifying an image generation device to color correction information, which utilizes a definition of a color space in the image generation device for color correction of an image; an image input module that inputs an image with specific device identification information attached thereto; an information retrieval module that sets the specific device identification information attached to the input image as a key of retrieval and retrieves specific color correction information stored in mapping to the specific device identification information in the information storage module; and a color correction information attachment module that, when the specific color correction information is retrieved corresponding to the specific device identification information attached to the input image, attaches the retrieved color correction information to the input image.

The first image processing apparatus of the invention sets specific device identification information, which is used to identify an image generation device and is attached to an input image, as a key of retrieval, retrieves specific color correction information stored in mapping to the specific device identification information, and attaches the retrieved color correction information to the input image. Here the color correction information utilizes the definition of the color space in the image generation device for color correction. A printing device for printing images or a display device for displaying images applies the color correction information attached to each input image for image printing or image display and thereby prints or displays the image with reflection of the color correction information. Simple image input to the printing device or the display device thus triggers automatic color correction of any arbitrary images with identical device identification information attached thereto. The color correction information utilizes the definition of the color space in the image generation device for color correction and thereby does not modify the image itself. This arrangement thus effectively prevents deterioration of the image due to color correction. The color correction information is set to have the specifications according to the user's requirements. The technique of this invention enables the user to readily carry out color correction of a large number of images according to the user's preferences, while ensuring desired color matching to print or display a processed image according to the user's preferences. Here the device identification information may be information for individual recognition of the image generation device or information for identifying a manufacturer of the image generation device.

In one preferable application of the first image processing apparatus of the invention, the image input module inputs an image with color space information for regulating a variation in color space of the image generation device, and the color correction information attachment module replaces the color space information attached to the input image with the retrieved color correction information. The color correction information may function as color space information for regulating a variation in color space of the image generation device. And in this application, the color space information may be an ICC profile.

In another preferable application of the first image processing apparatus of the invention, the color correction information attachment module, when the specific color correction information is retrieved corresponding to the specific device identification information attached to the input image, causes a user to select attachment or non-attachment of the retrieved color correction information to the input image.

In one preferable embodiment of the invention, the first image processing apparatus further includes: an object image input module that inputs an image as an object of generation of color correction information, where certain device identification information is attached in advance to the input image; a color adjustment module that performs color adjustment of the input image; a color correction information generation module that compares an original image prior to the color adjustment by the color adjustment module with a resulting color-adjusted image after the color adjustment and generates color correction information; and a color correction information storage module that stores the generated color correction information in mapping to the certain device identification information, which is attached to the input image as the object of generation of color correction information, into the information storage module.

A second image processing apparatus of the present invention is an apparatus that corrects color of an image, the image processing apparatus including: an information storage module that stores at least one piece of color correction information, which is used to regulate a variation in color space of an image processing device and to implement color correction of an image by color conversion different from the variation in color space; an image input module that inputs an image; and a color correction information attachment module that attaches the color correction information stored in the information storage module to the input image.

The second image processing apparatus of the invention stores the color correction information, which is used to regulate a variation in color space of an image processing device and to implement color correction of an image by color conversion different from the variation in color space, and attaches the stored color correction information to an input image. A printing device for printing images or a display device for displaying images applies the color correction information attached to each input image for image printing or image display and thereby prints or displays the image with reflection of the color correction information. The color correction information is used to regulate the variation in color space of the image processing device and implement color correction of an image by color conversion different from the variation in color space, and thereby attains color correction of each image without modifying the image itself. This arrangement thus effectively prevents deterioration of the image due to color correction. The color correction information is set to have the specifications according to the user's requirements. The technique of this invention enables the user to readily carry out color correction of a large number of images according to the user's preferences, while ensuring desired color matching to print or display a processed image according to the user's preferences.

In one preferable application of the second image processing apparatus, the color correction information attachment module displays a list of the color correction information stored in the information storage module and causes a user to select a desired piece of the color correction information for attachment to the input image.

In another preferable application of the second image processing apparatus of the invention, the information storage module stores a mapping of device identification information for identifying an image generation device to color correction information, the image input module inputs an image with specific device identification information attached thereto, and the color correction information attachment module retrieves specific color correction information corresponding to the specific device identification information and attaches the retrieved color correction information to the input image. In this application, the device identification information may be information for individual recognition of the image generation device or information for identifying a manufacturer of the image generation device.

In the second image processing apparatus, the color correction information may function as color space information for regulating a variation in color space of the image generation device. In this case, the color space information may be an ICC profile.

In one preferable embodiment of the invention, the second image processing apparatus further includes: an object image input module that inputs an image as an object of generation of color correction information; a color adjustment module that performs color adjustment of the input image; a color correction information generation module that compares an original image prior to the color adjustment by the color adjustment module with a resulting color-adjusted image after the color adjustment and generates color correction information; and a color correction information storage module that stores the generated color correction information into the information storage module.

The technique of the present invention is not restricted to the first image processing apparatus or the second image processing apparatus described above, but is also applicable to a first image processing method with the first image processing apparatus as well as to a second image processing method with the second image processing apparatus.

DESCRIPTION OF THE PREFERRED EMBODIMENTS

Figure 1:
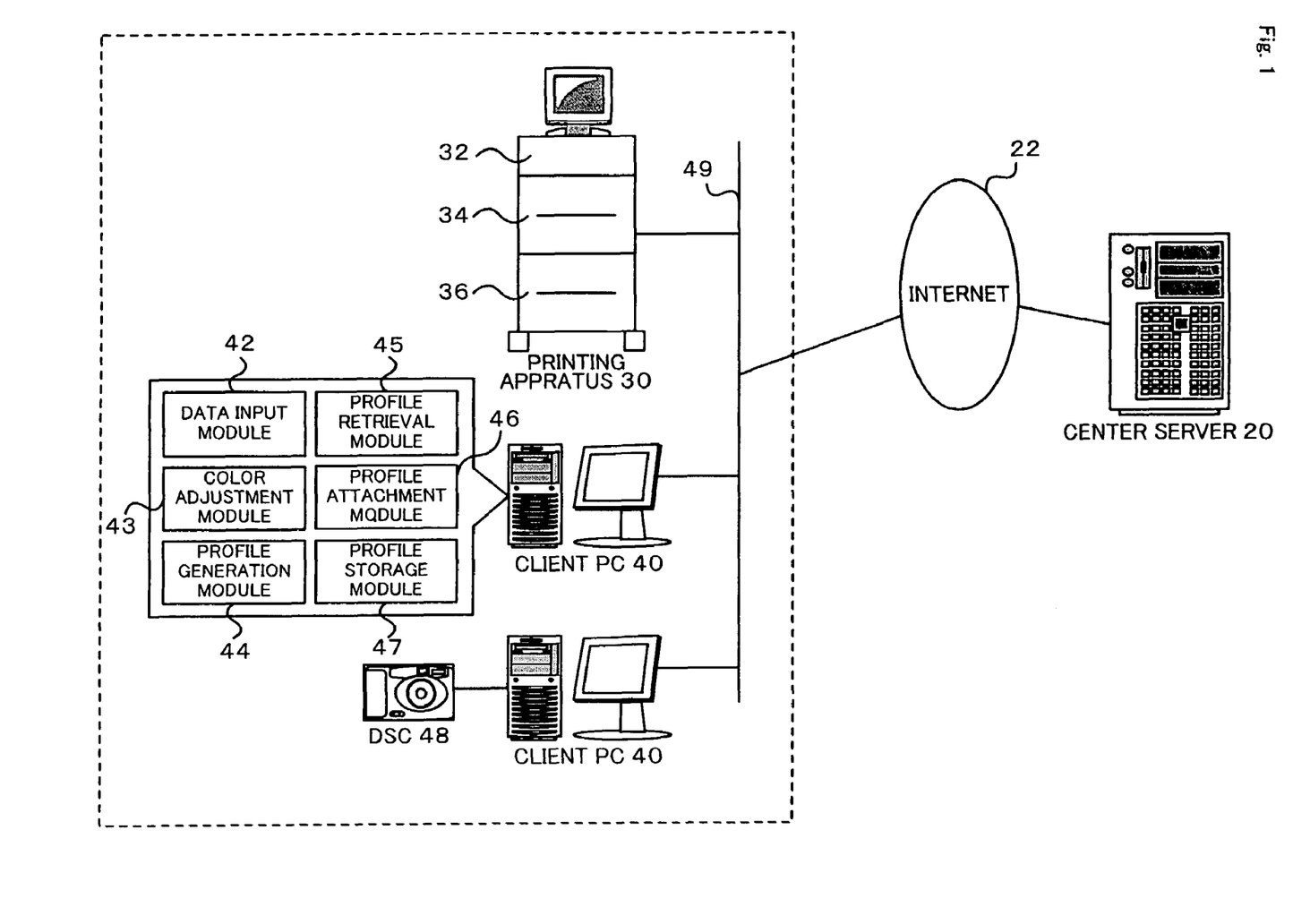
FIG. 1 schematically illustrates the configuration of a printing system.

One mode of carrying out the invention is discussed below as a preferred embodiment. FIG. 1 schematically illustrates the configuration of a printing system including multiple client computers (hereafter referred to as client PCs) 40, each of which functions as an image processing apparatus, in one embodiment of the invention. The printing system of the embodiment is constructed by connecting a printing apparatus 30 that performs color matching and prints images with the multiple client PCs 40 via a LAN 49. A center server 20 is linked with the LAN 49 via the Internet 22.

Each of the client PCs 40 is a PC/AT convertible computer and includes a CPU, a RAM, a hard disk, and a monitor. Diverse software programs are installed in each of the client PCs 40. The software programs include image processing software executed to make image data input from a digital camera 48 or the hard disk go through a series of image processing, layout processing software executed to lay out each input image on printing paper, and profile processing software executed to generate a profile, which defines a color space of each input image and is used for color matching, and to attach the generated profile to the image. FIG. 1 also shows the functional blocks of the client PC 40, which mainly relate to the profile processing software among the diverse software programs installed in the client PC 40. As illustrated, the functional blocks of the client PC 40 relating to the profile processing include a data input module 42 that inputs image data of an original image as an object of profile generation, a color adjustment module 43 that adjusts the color of each input image, and a profile generation module 44 that generates a profile based on a color-adjusted image and the original image prior to the color adjustment. The client PC 40 also has, as its functional blocks, a profile storage module 47 that stores the generated profile with an ID allocated to the digital camera 48 used for taking the original image, a profile retrieval module 45 that retrieves a profile of input image data in the profile storage module 47 based on the ID of the digital camera 48 used for taking the original image, and a profile attachment module 46 that attaches the retrieved profile to the input image data. The client PC 40 also includes an image processing module that carries out color tone correction according to the image processing software, a layout processing module that lays out each input image on printing paper according to the layout processing software, and a print instruction module that transfers image data, layout data, an ICC profile for printing, and print instruction data for specifying the type and the size of printing paper and the number of copies in the form of a print job to the printing apparatus 30. These functional blocks are not specifically illustrated.

The printing apparatus 30 includes two high-performance inkjet printers 34 and 36 and a print server 32 that manages distribution of print jobs received from the multiple client PCs 40 to the two inkjet printers 34 and 36. The print server 32 receives a print job from one of the client PCs 40 and distributes the received print job in the unit of pages or in the unit of copies to a selected one of the inkjet printers 34 and 36 according to the specifications regarding the type and the size of printing paper and the current working statuses of the inkjet printers 34 and 36. The print server 32 also lays out an image, generates and spools print data, and activates the selected inkjet printer 34 or 36 to implement printing according to the print data. The print server 32 also has functions of a Web server and informs the client PC 40 of the current statuses of spooled print jobs via a Web browser. The user of the client PC 40 is allowed to rearrange the printing order and cancel a selected print job on a Web interface provided by the print server 32.

The center server 20 functions to calculate charges according to records of printing sent from the print server 32 at regular intervals and supplements expendables according to their state consumptions.

Figure 2:
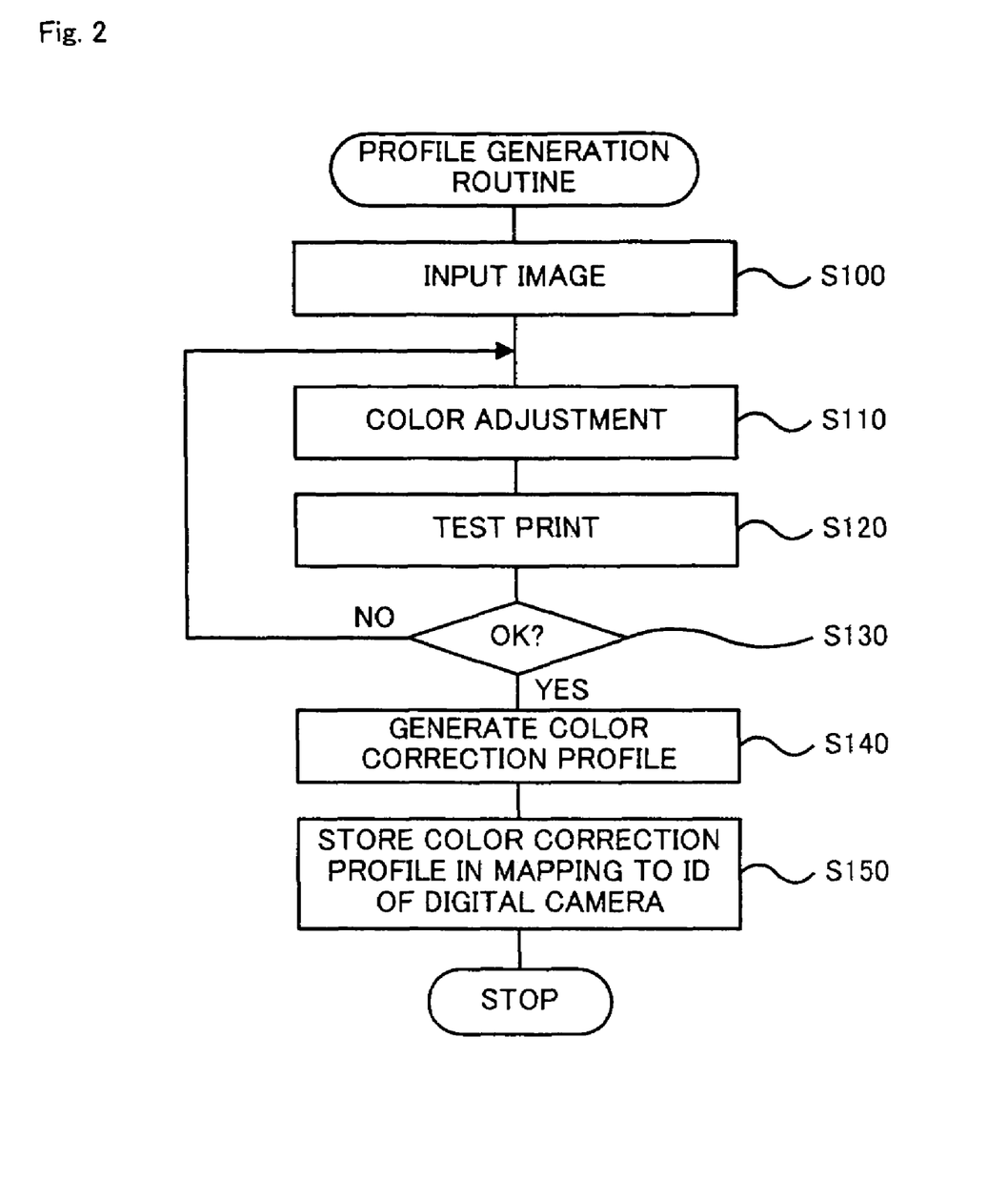
FIG. 2 is a flowchart showing a profile generation routine.

The following describes the operations of the client PC 40 constructed as discussed above, especially a series of profile-related processing. FIG. 2 is a flowchart showing a profile generation routine. The profile generation routine first receives and inputs image data as an object of generation of a color correction profile (step S100). The input image may be a color chart IT8, which is standardized by ANSI (American National Standards Institute) IT8/SC4 and is taken with a digital camera as a subject of profile generation. The input image may otherwise be any snapshot image taken with the digital camera as the subject of profile generation or any image with an ICC profile attached thereto. In any case, ID information of the digital camera as the subject of profile generation is required to accompany the input image data.

Figure 3:
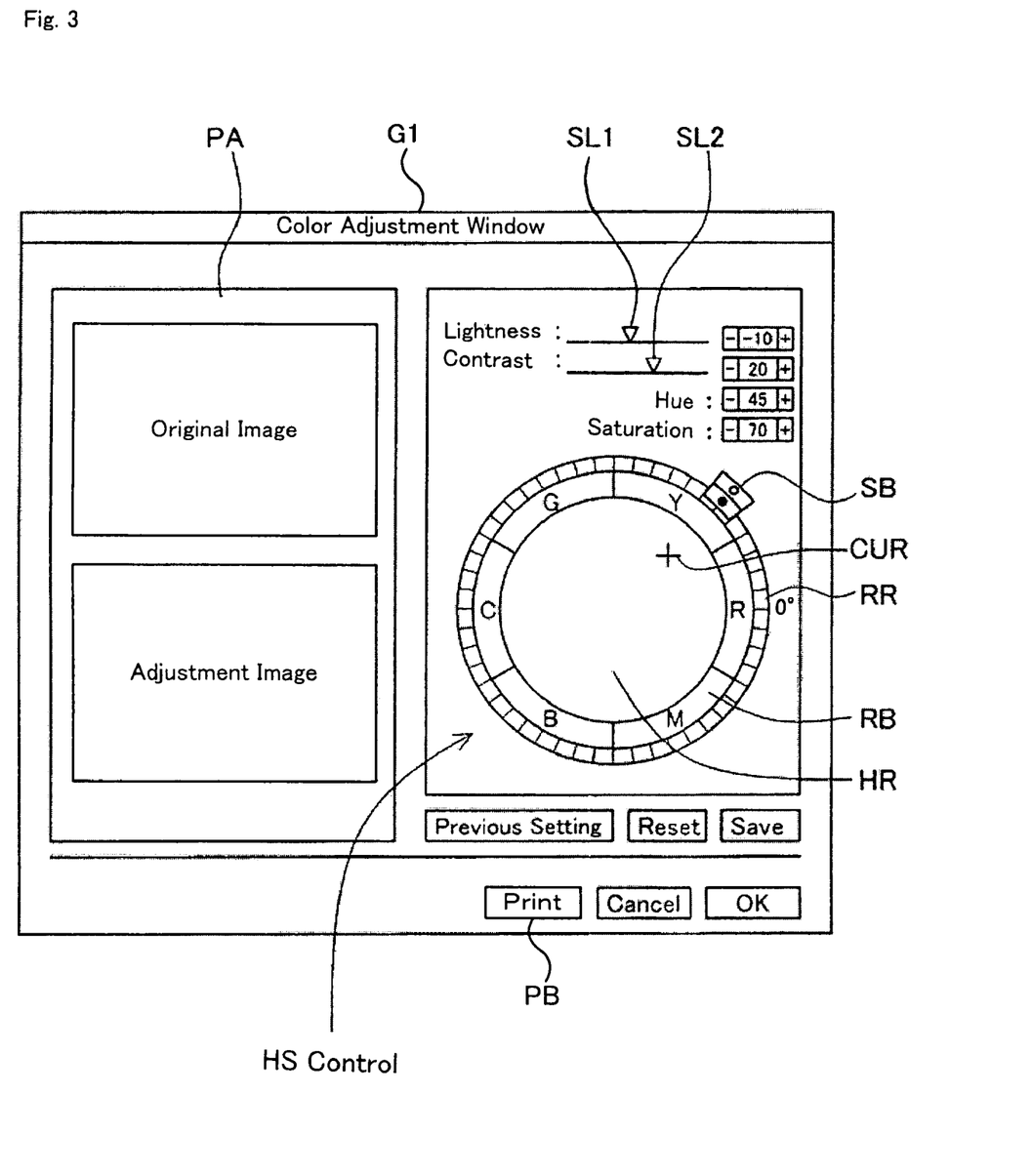
FIG. 3 shows one example of a color adjustment window G1.

The profile generation routine then opens a color adjustment window G1 on the monitor to allow the user of the client PC 40 to check up a test print and adjust the color of the input image (steps S110 and S120). One example of the color adjustment window G1 is shown in FIG. 3. In the illustrated example, the color adjustment window G1 includes a preview area PA on the left half and various controls for color adjustment on the right half. The preview area PA displays an original image prior to color adjustment on the upper half and an adjustment image under color adjustment on the lower half. When an ICC profile is attached to the input image, the color space is adjusted with the ICC profile to be approximate to the color of the digital camera used for taking the image. The image of the adjusted color space is displayed as the original image and the initial adjustment image in the preview area PA. When no ICC profile is attached to the input image, on the other hand, the input image itself is displayed as the original image and the initial adjustment image in the preview area PA. The user manipulates the various controls to adjust the color of the adjustment image displayed in the preview area PA. The user's manipulation of the controls for color adjustment is reflected in real time on the display of the adjustment image in the preview area PA. The controls on the color adjustment window G1 include, for example, a lightness slide bar SL1 for varying the lightness in a range of –60% to +60%, a contrast slide bar SL2 for varying the contrast in a range of –40% to +40%, a hue input box for varying the hue in a range of 0 to 360 degrees, a saturation input box for varying the saturation in a range of 0% to 100%, and a circular HS control for intuitively varying the hue and the saturation. The user manipulates the lightness slide bar SL1, the contrast slide bar SL2, the hue input box, the saturation input box, and the HS control to attain desired color adjustment. The HS control is described more in detail.

The display of the HS control includes a hue ring HR, on which colors of different hues are arranged in a circle. The hues are arranged to continuously and smoothly change the color in the order of red→yellow→green→cyan→blue →magenta→red counterclockwise from a position '0°'. The saturation increases radially from the center point of the circle on the hue ring HR. A cursor CUR appearing in the HS control is displayed on a straight line connecting the center point of the hue ring HR with the center of a saturation button SB. In the initial state, the cursor CUR is set on the center point of the hue ring HR. The position of the cursor CUR in the HS control specifies the hue and the saturation. The user drags and rotates a rotation ring RR with the mouse to change the hue. The saturation button SB and the cursor CUR rotate simultaneously with the rotation of the rotation ring RR. Manipulation of the rotation ring RR enables the user to vary only the hue while keeping the saturation unchanged. The saturation button SB is located on the rotation ring RR and is used to vary the saturation. The user clicks an open circle and a closed circle displayed on the saturation button SB to heighten and lower the saturation. The cursor CUR moves toward the saturation button SB or toward the center point of the hue ring HR, in response to the user's click on the saturation button SB. Manipulation of the saturation button SB enables the user to vary only the saturation while keeping the hue unchanged. A ring button RB consists of six buttons R (red), Y (yellow), G (green), C (cyan), B (blue), and M (magenta). The user clicks any of these six buttons to instantaneously specify a hue corresponding to the clicked button. A long click of the ring button RB increases the saturation. In response to the user's click of a selected button on the ring button RB, the cursor CUR and the saturation button SB move onto a straight line connecting the center point of the hue ring HR with the center of the clicked button on the ring button RB. The user is also allowed to drag and move the cursor CUR in the HS control with the mouse to simultaneously vary both the saturation and the hue. The saturation button SB rotates with the movement of the cursor CUR.

A print button PB is located on the bottom of the color adjustment window G1. The user clicks the print button PB in the course of color adjustment to print the adjustment image under color adjustment with the printing apparatus 30. The user manipulates the various controls to give some color adjustment, prints the adjustment image under color adjustment to check the current result of color adjustment, again manipulates the various controls to give another color adjustment, and again prints the adjustment image to check the result of further color adjustment. In this manner, the user successively carries out color adjustment while checking the result of the color adjustment to attain a desired result. Color matching between the monitor and the inkjet printers 34 and 36 is performed in the case of printing the adjustment image with the printing apparatus 30, in the same manner as standard printing.

The user clicks an 'OK' button located on the bottom of the color adjustment window G1 to conclude the color adjustment (step S130). In response to the user's click of the 'OK' button, the profile generation routine specifies the difference between the color of the original image and the color of a resulting color-adjusted image and generates a color correction profile for converting the original image into the resulting color-adjusted image (step S140). The color difference between the original image and the resulting color-adjusted image is specified with regard to a target color of color adjustment. Data with regard to the other colors are generated by an interpolation technique. For example, it is assumed that a desired color patch of the input image IT8 as the target color goes through color adjustment. With regard to the target color of color adjustment, data are generated by specifying the difference between the color before the color adjustment and the color after the color adjustment. With regard to colors approximate to the target color of color adjustment, data are generated to have a smaller color difference with a smaller degree of color approximation. The color adjustment of the target color thus simultaneously attains color adjustment of the colors approximate to the target color. This technique ensures a smooth color change of the target color and the colors approximate to the target color by the color adjustment. When an ICC profile is attached to the input image, the color correction profile is generated in such a manner that the color difference due to the color adjustment is reflected on the ICC profile. In the case of the input image with an ICC profile, a color-matched image with the ICC profile is displayed as the original image in the preview area PA on the color adjustment window G1. Reflection of the attached ICC profile assures the better color reproduction with regard to the colors that are not the object of color adjustment and the colors that are not affected by color adjustment. When the ICC profile is not attached to the input image, the color correction profile is generated as a new ICC profile based on the color difference between the original image and the resulting color-adjusted image.

The profile generation routine labels the generated color correction profile, and stores the labeled color correction profile in mapping to the ID information of the digital camera, which is used for taking the input image, in a profile storage area of the hard disk (not shown) functioning as the profile storage module 47 (step S150). The profile generation routine is then terminated. One concrete procedure of storing the color correction profile allocates an ID to the generated color correction profile, stores the color correction profile with the ID in the profile storage area, and registers the ID of the color correction profile mapped to the ID of the digital camera in a database.

Figure 4:
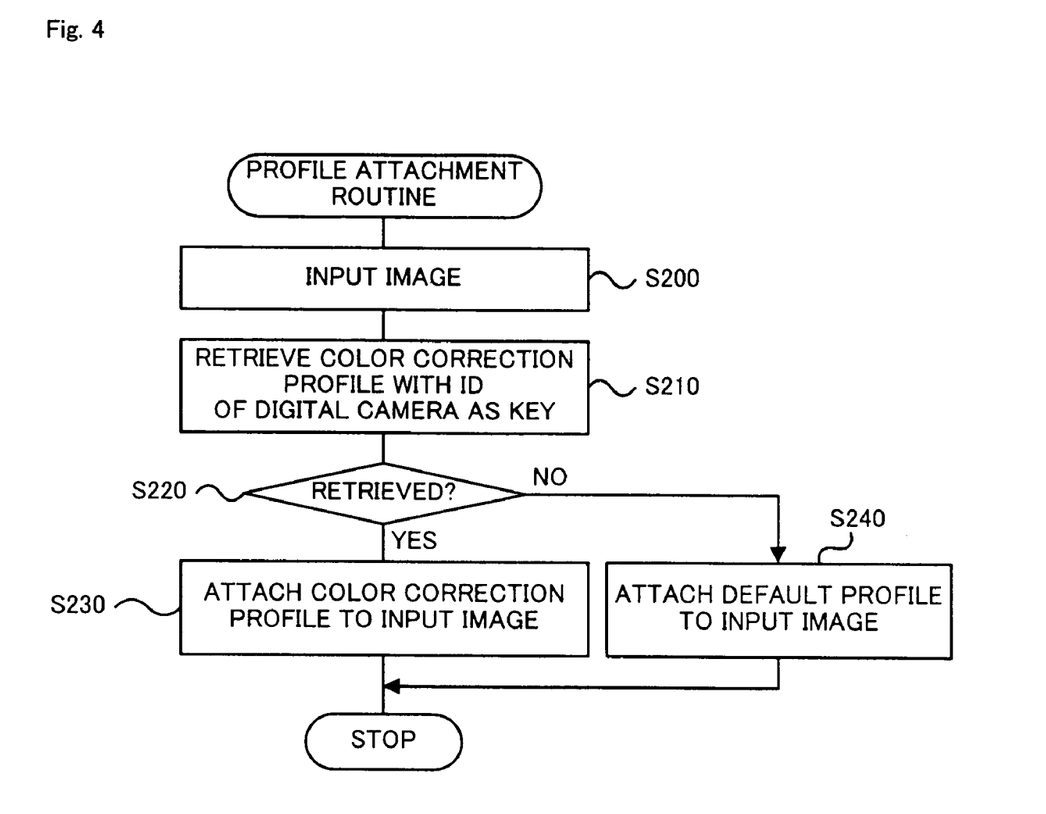
FIG. 4 is a flowchart showing a profile attachment routine.

The following describes attachment of the color correction profile to the input image. FIG. 4 is a flowchart showing a profile attachment routine. This processing routine is executed when the image processing software or the layout processing software is activated in the client PC 40 and an image is newly input from a storage unit of the digital camera 48 for image processing or layout processing. The profile attachment routine first receives and inputs image data (step S200), and sets an ID of the digital camera included in the input image data as a key of retrieval and retrieves a color correction profile mapped to the ID of the digital camera in the profile storage module 47 (steps S210 and S220). When any color correction profile corresponding to the ID of the digital camera is retrieved successfully, the profile attachment routine attaches the retrieved color correction profile to the input image (step S230). In the case of the input image with an ICC profile, the processing of step S230 replaces the ICC profile with the retrieved color correction profile. In the case of the input image with no ICC profile, the processing of step S230 simply attaches the retrieved color correction profile to the input image. The profile attachment routine is then terminated. When no color correction profile is retrieved corresponding to the ID of the digital camera, on the other hand, the profile attachment routine attaches a default profile to the input image (step S240). In the case of the input image with an ICC profile, the processing of step S240 specifies the ICC profile as a default profile. In the case of the input image with no ICC profile, the processing of step S240 attaches a preset default profile (for example, an sRGB profile) to the input image. The profile attachment routine is then terminated. The color correction profile generated as the result of color adjustment is thus automatically attached to images taken with the identical digital camera. The image with the color correction profile attached thereto goes through color matching based on the color correction profile in the course of processing by the image processing software or the layout processing software or in the course of printing with the printing apparatus 30. Namely the images taken with the same digital camera automatically go through color adjustment based on the color correction profile attached to the images.

As described above, the client PC 40 executes the profile attachment process of the embodiment to set the ID of the digital camera included in input image data as a key of retrieval and to retrieve a color correction profile stored in mapping to the ID of the digital camera. When any color correction profile corresponding to the ID of the digital camera is retrieved successfully, the retrieved color correction profile is attached to the input image. This arrangement enables the images taken with the same digital camera to automatically go through color adjustment based on the color correction profile. The color correction profile is described in the ICC format as a profile for regulating a variation in color space of the digital camera. This arrangement ensures color adjustment of the image without modifying the image itself and thus effectively prevents deterioration of the image due to color correction. The color correction profile is set to have the specifications according to the user's requirements. The technique of this embodiment enables the user to readily carry out color correction of a large number of images according to the user's preferences, while ensuring desired color matching to print or display a processed image according to the user's preferences.

The client PC 40 specifies the result of desired color adjustment of an input image as a color correction profile according to the profile generation routine of the embodiment. This arrangement facilitates generation of a color correction profile, which is used for desired color adjustment of newly input images. In the case of an input image with an ICC profile, as one aspect, the client PC 40 sets the input image adapted by the ICC profile to the original image of color adjustment and generates a color correction profile as a result of the color adjustment by modifying the attached ICC profile according to the profile generation process. This arrangement ensures generation of an appropriate color correction profile. As another aspect, the client PC 40 displays the original image and the adjustment image in alignment in the preview area PA on the color adjustment window G1 according to the profile generation process. This arrangement enables the user to attain desired color adjustment, based on comparison between the original image and the adjustment image under color adjustment. As still another aspect, the user of the client PC 40 is allowed to print the adjustment image under color adjustment with the printing apparatus 30 by simply clicking the print button PB on the color adjustment window G1 in the middle of color adjustment. This arrangement enables the user to attain desired color adjustment while successively checking the current state of color adjustment.

In the client PC 40 executing the profile attachment process of the embodiment, the profile storage module 47 corresponds to the information storage module of the invention. The data input module 42 executing the processing of step S200 in the profile attachment routine of FIG. 4 corresponds to the image input module of the invention. The profile retrieval module 45 executing the processing of step S210 in the profile attachment routine of FIG. 4 corresponds to the information retrieval module of the invention. The profile attachment module 46 executing the processing of step S230 in the profile attachment routine of FIG. 4 corresponds to the color correction information attachment module of the invention. In the client PC 40 executing the profile generation process of the embodiment, the data input module 42 executing the processing of step S100 in the profile generation routine of FIG. 2 corresponds to the object image input module of the invention. The color adjustment module 43 executing the processing of steps S110 through S130 in the profile generation routine of FIG. 2 corresponds to the color adjustment module of the invention. The profile generation module 44 executing the processing of step S140 in the profile generation routine of FIG. 2 corresponds to the color correction information generation module of the invention. The profile storage module 47 executing the processing of step S150 in the profile generation routine of FIG. 2 corresponds to the color correction information storage module of the invention.

Figure 5:
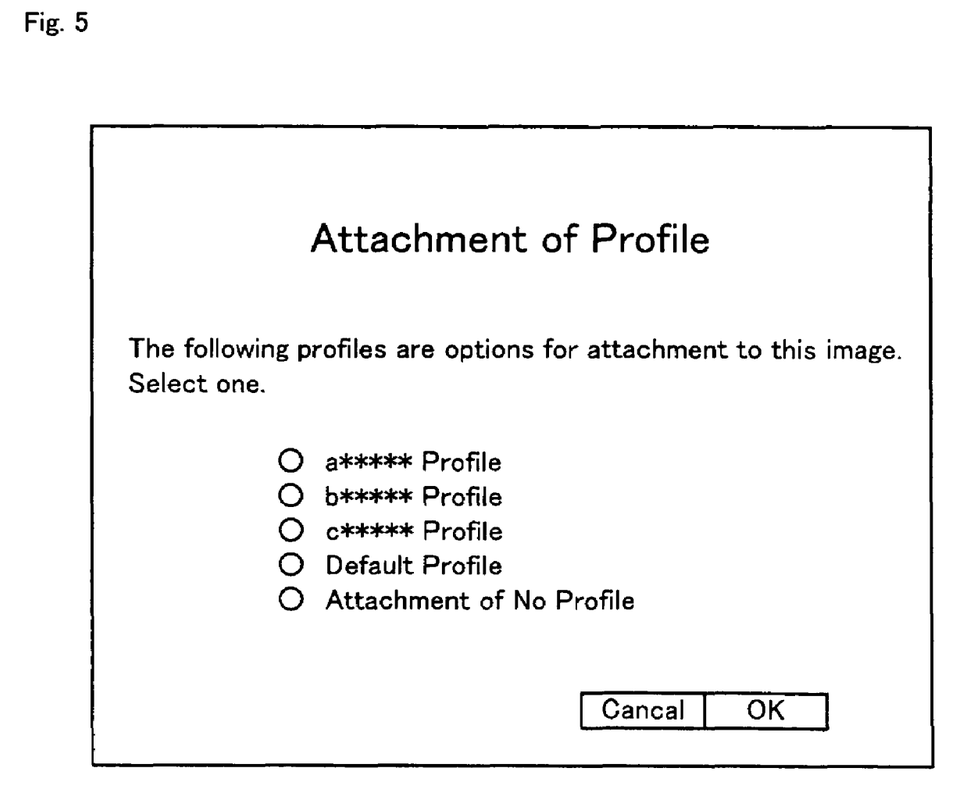
FIG. 5 shows one example of a profile attachment selection window.

The profile attachment routine of the embodiment sets the ID of the digital camera included in input image data as a key of retrieval and retrieves a color correction profile stored in mapping to the ID of the digital camera. When any color correction profile corresponding to the ID of the digital camera is retrieved successfully, the profile attachment routine automatically attaches the retrieved color correction profile to the input image. One possible modification may allow the user to select attachment or non-attachment of a color correction profile. In this modified structure, for example, a profile attachment selection window shown in FIG. 5 opens to ask the user to attach or not attach any of optional color correction profiles to the input image.

When no ICC profile is attached to an input image, the profile attachment routine of the embodiment attaches a preset default profile to the input image. One possible modification may not attach any default profile to the input image.

A second embodiment of the invention is discussed below. The printing system of the second embodiment has the identical hardware configuration with that of the printing system of the first embodiment and executes the profile generation routine shown in the flowchart of FIG. 2. The hardware configuration of the second embodiment and the profile generation routine executed in the second embodiment are thus not specifically described here. The respective elements of the second embodiment are expressed by the same numerals and symbols as those of the first embodiment.

Figure 6:
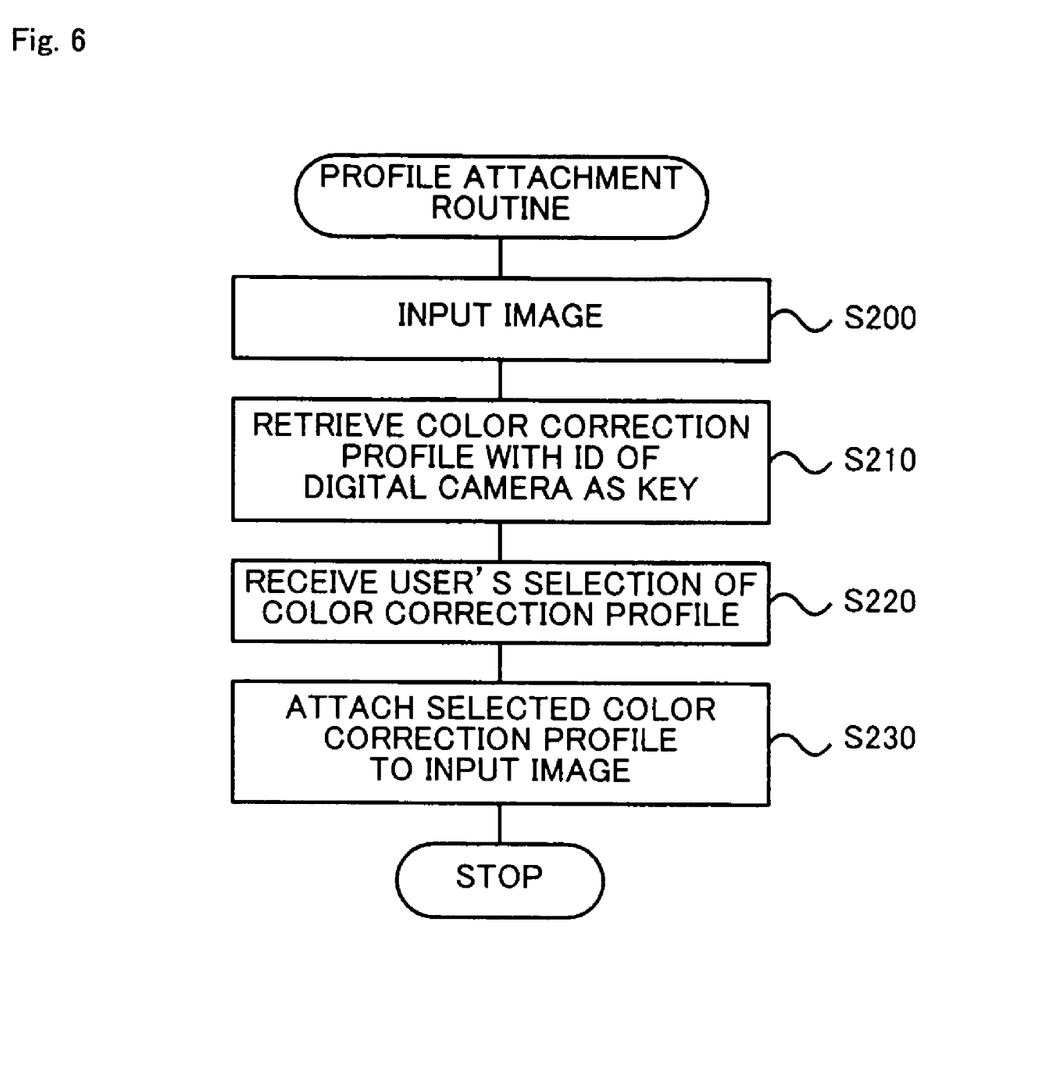
FIG. 6 is a flowchart showing a profile attachment routine in a second embodiment.

The printing system of the second embodiment executes a profile attachment routine shown in the flowchart of FIG. 6, in place of the profile attachment routine of FIG. 4. This processing routine is executed when the image processing software or the layout processing software is activated in the client PC 40 and an image is newly input from a storage unit of the digital camera 48 for image processing or layout processing. The profile attachment routine first receives and inputs image data (step S300), and sets an ID of the digital camera included in the input image data as a key of retrieval and retrieves any color correction profile mapped to the ID of the digital camera in the profile storage module 47 (step S310).

Figure 7:
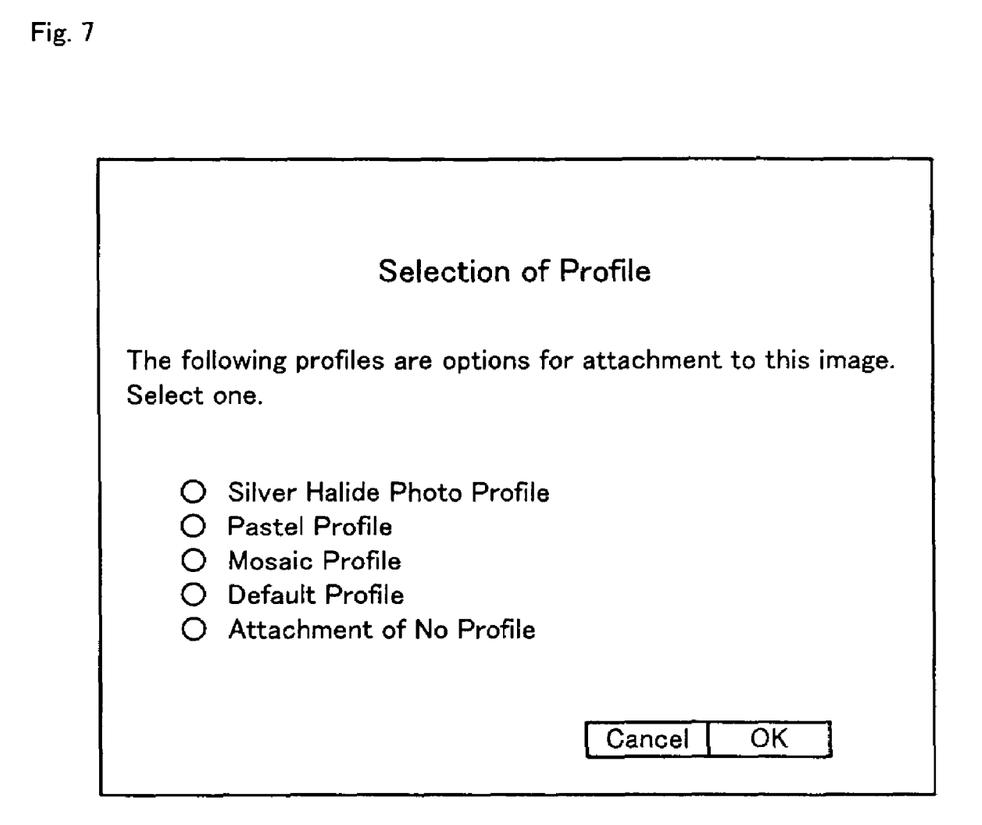
FIG. 7 shows one example of a profile selection window.

When any color correction profile corresponding to the ID of the digital camera is retrieved, a list of all the retrieved color correction profiles is displayed to allow the user to select a desired color correction profile for attachment to the image (step S320). FIG. 7 shows a profile selection window as an example. In the illustrated example of FIG. 7, options include a preset default profile (for example, an sRBG profile) and attachment of no profile, as well as multiple retrieved color correction profiles. In response to the user's selection of a desired option, the profile attachment routine attaches the selected color correction profile to the input image (step S330). In the case of the input image with an ICC profile, the processing of step S330 replaces the ICC profile with the selected color correction profile. In the case of the input image with no ICC profile, the processing of step S330 simply attaches the selected color correction profile to the input image. The profile attachment routine is then terminated. When the user selects the preset default profile, the selected default profile is attached to the input image. When the user selects the option 'attachment of no profile', no profile is attached to the input image. The profile attachment process of the second embodiment accordingly ensures attachment of a selected profile for desired color adjustment to each input image. The image with the color correction profile attached thereto goes through color matching based on the color correction profile in the course of processing by the image processing software or the layout processing software or in the course of printing with the printing apparatus 30.

As described above, the client PC 40 executes the profile attachment process of the second embodiment to set the ID of the digital camera included in input image data as a key of retrieval and to retrieve any color correction profile stored in mapping to the ID of the digital camera. A color correction profile selected by the user among options including all the retrieved color correction profiles is attached to the input image. This arrangement facilitates desired color adjustment of any arbitrary image. The color correction profile is described in the ICC format as a profile for regulating a variation in color space of the digital camera. This arrangement ensures color adjustment of the image without modifying the image itself and thus effectively prevents deterioration of the image due to color correction. The color correction profile is set to have the specifications according to the user's requirements. The technique of this embodiment enables the user to readily carry out color correction of a large number of images according to the user's preferences, while ensuring desired color matching to print or display a processed image according to the user's preferences.

The client PC 40 specifies the result of desired color adjustment of an input image as a color correction profile according to the profile generation routine of the second embodiment. This arrangement facilitates generation of a color correction profile, which is used for desired color adjustment of newly input images. In the case of an input image with an ICC profile, as one aspect, the client PC 40 sets the input image adapted by the ICC profile to the original image of color adjustment and generates a color correction profile as a result of the color adjustment by modifying the attached ICC profile according to the profile generation process. This arrangement ensures generation of an appropriate color correction profile. As another aspect, the client PC 40 displays the original image and the adjustment image in alignment in the preview area PA on the color adjustment window G1 according to the profile generation process. This arrangement enables the user to attain desired color adjustment, based on comparison between the original image and the adjustment image under color adjustment. As still another aspect, the user of the client PC 40 is allowed to print the adjustment image under color adjustment with the printing apparatus 30 by simply clicking the print button PB on the color adjustment window G1 in the middle of color adjustment. This arrangement enables the user to attain desired color adjustment while successively checking the current state of color adjustment.

In the client PC 40 executing the profile attachment process of the second embodiment, the profile storage module 47 corresponds to the information storage module of the invention. The data input module 42 executing the processing of step S300 in the profile attachment routine of FIG. 6 corresponds to the image input module of the invention. The profile retrieval module 45 and the profile attachment module 46 executing the processing of steps S310 through S330 in the profile attachment routine of FIG. 6 corresponds to the color correction information attachment module of the invention. In the client PC 40 executing the profile generation process of the second embodiment, the data input module 42 executing the processing of step S100 in the profile generation routine of FIG. 2 corresponds to the object image input module of the invention. The color adjustment module 43 executing the processing of steps S110 through S130 in the profile generation routine of FIG. 2 corresponds to the color adjustment module of the invention. The profile generation module 44 executing the processing of step S140 in the profile generation routine of FIG. 2 corresponds to the color correction information generation module of the invention. The profile storage module 47 executing the processing of step S150 in the profile generation routine of FIG. 2 corresponds to the color correction information storage module of the invention.

The profile attachment process of the second embodiment retrieves any color correction profile stored in mapping to the ID of the digital camera as an image generation device, which is included in the input image data, and asks the user to select a desired color correction profile for attachment to the input image among options including all the retrieved color correction profiles. One possible modification may store a single color correction profile corresponding to the ID of the digital camera and automatically attach the single color correction profile retrieved corresponding to the ID of the digital camera, which is included in the input image data.

The profile generation process of the second embodiment stores the generated color correction profile in mapping to the ID of the digital camera. In one possible modification, the generated color correction profile may be stored alone without being mapped to the ID of the digital camera.

When an ICC profile is attached to an input image, the profile generation routine of the first or the second embodiment generates a color correction profile by modifying the ICC profile with reflection of the color difference between the original image adapted by the ICC profile and a resulting color-adjusted image. When no ICC profile is attached to an input image, on the other hand, the profile generation routine of the embodiment directly generate a color correction profile based on the color difference between the original image and a resulting color-adjusted image. When an ICC profile is attached to an input image, one possible modification may directly generate a color correction profile based on the color difference between the original image without adaptation by the ICC profile and a resulting color-adjusted image. When no ICC profile is attached to an input image, one possible modification may attach a preset default ICC profile to the input image and generate a color correction profile by modifying the default ICC profile with reflection of the color difference between the original image adapted by the default ICC profile and a resulting color-adjusted image.

The profile generation routine of the first or the second embodiment displays the original image and the adjustment image under color adjustment in alignment in the preview area PA on the color adjustment window G1. The user accordingly completes desired color adjustment, based on comparison between the original image and the adjustment image under color adjustment. One possible modification may display only the adjustment image under color adjustment in the preview area PA, while omitting the original image from the display.

The structure of the first or the second embodiment uses the HS control on the color adjustment window G1 to vary the hue and the saturation. The HS control is, however, not restrictive at all, and any other suitable technique may be adopted for color adjustment of the image.

The profile generation routine of the first or the second embodiment allows the user to print the adjustment image with the printing apparatus 30 in the middle of color adjustment and check the current state of color adjustment. One possible modification may prohibit printing of the adjustment image with the printing apparatus 30 in the middle of color adjustment.

The profile generation routine of the first or the second embodiment specifies the result of color adjustment of input image data including an ID of the digital camera as a color correction profile and stores the color correction profile in mapping to the ID of the digital camera. The ID of the digital camera is not restrictively mapped to the color correction profile. Any other information for individual recognition of the digital camera or information for identifying a manufacturer of the digital camera may be mapped to the color correction profile. The digital camera is not a restrictive example for generation of an image. The color correction profile may thus be stored in mapping to any information for individual recognition of any other image generation device, such as a scanner, or information for identifying a manufacturer of the image generation device.

In the structure of the above first or second embodiment, the profile processing software, which is different from the image processing software and the layout processing software, is installed in the client PC 40 to implement the profile generation process and the profile attachment process. In one possible modification, image processing software programmed to include the functions of the profile generation process and the profile attachment process may be installed in the client PC 40. This arrangement enables the user to carry out color adjustment and image processing on an identical window.

The above first or second embodiment regards the profile processing software executed to implement the profile generation process and the profile attachment process, as well as the client PC 40 with the profile processing software installed therein. The invention may also be attained by a corresponding profile generation method and a corresponding profile attachment method.

The above embodiments are to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

What is claimed is:

1. An image processing apparatus that corrects color of an image, said image processing apparatus comprising:
an information storage module that stores a mapping of device identification information for identifying an image generation device to color correction information, which utilizes a definition of a color space in the image generation device for color correction of an image;
an image input module that inputs an image with specific device identification information attached thereto;
an information retrieval module that sets the specific device identification information attached to the input image as a key of retrieval and retrieves specific color correction information stored in mapping to the specific device identification information in said information storage module; and
a color correction information attachment module that, when the specific color correction information is retrieved corresponding to the specific device identification information attached to the input image, attaches the retrieved color correction information to the input image.

2. An image processing apparatus in accordance with claim 1, wherein said image input module inputs an image with color space information for regulating a variation in color space of the image generation device, and
said color correction information attachment module replaces the color space information attached to the input image with the retrieved color correction information.

3. An image processing apparatus in accordance with claim 2, wherein the color space information is an ICC profile.

4. An image processing apparatus in accordance with claim 1, wherein the color correction information functions as color space information for regulating a variation in color space of the image generation device.

5. An image processing apparatus in accordance with claim 4, wherein the color space information is an ICC profile.

6. An image processing apparatus in accordance with claim 1, wherein said color correction information attachment module, when the specific color correction information is retrieved corresponding to the specific device identification information attached to the input image, causes a user to select attachment or non-attachment of the retrieved color correction information to the input image.

7. An image processing apparatus in accordance with claim 1, wherein the device identification information is either of information for individual recognition of the image generation device and information for identifying a manufacturer of the image generation device.

8. An image processing apparatus in accordance with claim 1, said image processing apparatus further comprising:
an object image input module that inputs an image as an object of generation of color correction information, where certain device identification information is attached in advance to the input image;
a color adjustment module that performs color adjustment of the input image;
a color correction information generation module that compares an original image prior to the color adjustment by said color adjustment module with a resulting color-adjusted image after the color adjustment and generates color correction information; and
a color correction information storage module that stores the generated color correction information in mapping to the certain device identification information, which is attached to the input image as the object of generation of color correction information, into said information storage module.

9. An image processing apparatus that corrects color of an image, said image processing apparatus comprising:
an information storage module that stores at least one piece of color correction information, which is used to regulate a variation in color space of an image processing device and to implement color correction of an image by color conversion different from the variation in color space, said information storage module storing a mapping of device identification information for identifying an image generation device to color correction information;
an image input module that inputs an image with specific device identification information attached thereto; and
a color correction information attachment module that attaches the color correction information stored in said information storage module to the input image, said color correction information attachment module retrieving specific color correction information corresponding to the specific device identification information attached to the input image and attaching the retrieved color correction information to the input image.

10. An image processing apparatus in accordance with claim 9, wherein said color correction information attachment module displays a list of the color correction information stored in said information storage module and causes a user to select a desired piece of the color correction information for attachment to the input image.

11. An image processing apparatus in accordance with claim 9, wherein the device identification information is either of information for individual recognition of the image generation device or information for identifying a manufacturer of the image generation device.

12. An image processing apparatus in accordance with claim 9, wherein the color correction information functions as color space information for regulating a variation in color space of the image generation device.

13. An image processing apparatus in accordance with claim 12, wherein the color space information is an ICC profile.

14. An image processing apparatus in accordance with claim 9, said image processing apparatus further comprising:
an object image input module that inputs an image as an object of generation of color correction information;
a color adjustment module that performs color adjustment of the input image;
a color correction information generation module that compares an original image prior to the color adjustment by said color adjustment module with a resulting color-adjusted image after the color adjustment and generates color correction information; and
a color correction information storage module that stores the generated color correction information into said information storage module.

15. An image processing method that corrects color of an image, said image processing method comprising the steps of:
(a) storing a mapping of device identification information for identifying an image generation device to color correction information, which utilizes a definition of a color space in the image generation device for color correction of an image;
(b) when an image with specific device identification information attached thereto is input, setting the specific device identification information attached to the input image as a key of retrieval and retrieving specific color correction information stored in mapping to the specific device identification information; and (c) when the specific color correction information is retrieved corresponding to the specific device identification information attached to the input image, attaching the retrieved color correction information to the input image.

16. An image processing method in accordance with claim 15, wherein said step (b) is also performed when an image with color space information for regulating a variation in color space of the image generation device is input, and said step (c) replaces the color space information attached to the input image with the retrieved color correction information.

17. An image processing method in accordance with claim 15, wherein the color correction information functions as color space information for regulating a variation in color space of the image generation device.

18. An image processing method in accordance with claim 15, wherein said step (c), when the specific color correction information is retrieved corresponding to the specific device identification information attached to the input image, causes a user to select attachment or non-attachment of the retrieved color correction information to the input image.

19. An image processing method that corrects color of an image, said image processing method comprising the steps of:

(a) storing at least one piece of color correction information, which is used to regulate a variation in color space of an image processing device and to implement color correction of an image by color conversion different from the variation in color space, the storing of at least one piece of color correction information including storing a mapping of device identification information for identifying an image generation device to color correction information; and (b) attaching the stored color correction information to an input image, the attaching of the stored color correction information to the input image including, when an image with specific device identification information attached thereto is input, retrieving specific color correction information corresponding to the specific device identification information and attaching the retrieved color correction information to the input image.

20. An image processing method in accordance with claim 19, wherein said step (b) displays a list of the stored color correction information and causes a user to select a desired piece of the color correction information for attachment to the input image.

21. An image processing method in accordance with claim 19, wherein the color correction information functions as color space information for regulating a variation in color space of the image generation device.

* * * * *